United States Patent [19]
Jarman

[11] Patent Number: 4,903,246
[45] Date of Patent: Feb. 20, 1990

[54] MINEHUNTING SYSTEMS

[75] Inventor: Leonard B. Jarman, Dorset, England

[73] Assignee: Plessey Overseas Limited, Ilford, England

[21] Appl. No.: 244,420

[22] Filed: Sep. 15, 1988

[30] Foreign Application Priority Data

Mar. 15, 1988 [GB] United Kingdom ............... 8806077

[51] Int. Cl.$^4$ ............................................. G01S 15/00
[52] U.S. Cl. ........................................ 367/99; 367/96
[58] Field of Search .................. 367/99, 88, 95, 96, 367/1

[56] References Cited

U.S. PATENT DOCUMENTS

| | | | |
|---|---|---|---|
| 3,922,630 | 11/1975 | Murphree | 367/96 |
| 4,195,359 | 3/1980 | Miller et al. | 367/97 |
| 4,561,076 | 12/1985 | Gritsch | 367/88 |
| 4,571,711 | 2/1986 | Chadwick | 367/88 |

Primary Examiner—Thomas H. Tarcza
Assistant Examiner—Daniel T. Pihulic
Attorney, Agent, or Firm—Fleit. Jacobson, Cohn, Price, Holman & Stern

[57] ABSTRACT

The minehunting system includes a remotely operated vehicle which is driven ahead of a vessel. The vehicle is equipped with a sonar system for detecting, classifying and disposing of a mine.

The sonar system comprises an acoustic mirror sonar which includes a dual field-of-view reflector, a height finding element and a dual frequency classifier.

The vehicle has a autopilot which, is conjunction with control algorithms in a shipborne tactical computer on the vessel provides navigation and manoeuvering commands.

4 Claims, 1 Drawing Sheet

MINEHUNTING SYSTEMS

FIELD OF THE INVENTION

The present invention relates to a minehunting system and more particularly to a minehunting system utilizing a remote controlled vehicle.

DESCRIPTION OF THE PRIOR ART

In recent years significant improvements have been made in minehunting technology resulting in increased performance against an ever developing threat. These improvements include Minehunting sonar, Precise Navigation, Tractical Computer/Display and Remote Operated Vehicles.

As a result the minehunting system has become larger and more expensive. The costs however are far outweighed by the cost of specialist MCM vessels. The required capital investment of such vessels, the crews and the necessary support facilities limit all nations MCM capability to a far less than ideal force or none at all.

Most navies have many craft that can perform the endurance and sea keeping requirements of the MCM task. Conventional minehunting systems however, require that the vessel close the mine for classification and disposal, to a range that would be unsafe for a vessel without the complex and sophisticated signature reduction techniques that result in specialist, dedicated MCM vessels.

There is, therefore, a need for a minehunting system that meets the performance requirements of the current and future MCM environment and yet can be deployed from conventional, non specialist, craft that exist in todays fleets. Furthermore, should such a system be available existing MCM forces can be augmented with "ships taken up from trade" in times of war. Such a system must therefore:

a. afford an acceptable level of protection to the operator; without b. the prohibitive cost of total vessel signature reduction; while c. maintaining a high measure of effectiveness against the mine.

The prime requirement in this system is a sonar which can detect, classify and dispose of the mine before the mine comes within damage range of the ship.

STATEMENT OF THE OBJECTS OF THE INVENTION

An objective of the present invention is to provide an advanced remote minehunting system (ARMS) to satisfy the requirements of current and future MCM systems and yet be able to be deployed from conventional, non-specialist craft.

SUMMARY OF THE INVENTION

According to the present invention there is provided a minehunting system, the system comprising a remotely operated vehicle controllable to drive ahead of a vessel, the remotely operated vehicle being equipped with a sonar system for detecting, classifying and disposing of a mine.

In a preferred embodiment the sonar system comprises an acoustic mirror sonar, and in one embodiment the acoustic mirror sonar includes a dual field-of-view reflector, a height finding element and a dual frequency classifier.

Advantageously in one embodiment the sonar has a dual GRP 60° field-of-view reflector, a 100 KHZ height finding element and a dual frequency 300/450 KHZ classifier.

In one embodiment the remotely operated vehicle is provided with an autopilot which, in conjunction with control algorithms in a shipborne tactical computer on the vessel provides navigation and maneuvering commands to a propulsion system on the remotely operated vehicle, the commands including autonavigation and stabilisation down a selected search track; auto distance keeping and relative speed with respect to the vessel; responsive to hand control from the vessel when classification, identification and disposal of a mine is required; auto hover when commanded; auto recovery of search track when classification, identification and disposal maneuver is complete, and continuous indication of remotely operated vehicle position and target position with respect to vessel and search area.

BRIEF DESCRIPTION OF THE DRAWINGS

In a preferred embodiment the remotely operated vehicle is provided with an inertial sensor, an acoustic correlation velocity log and a navigation computer for achieving the precise navigation and control required.

The present invention will now be described further by way of example, with reference to the accompanying drawing in which.

DETAILED DESCRIPTION OF PREFERRED EMBODIMENT

Figure 1:
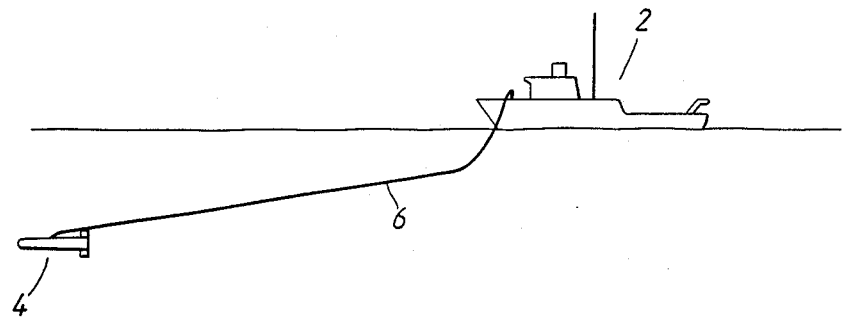
FIG. 1 illustrates a remotely operated vehicle (ROV) ahead of a parent vessel and FIG. 2 is a more detailed illustration of the ROV.

Referring to FIG. 1 there is shown a parent vessel 2 and an ROV 4 coupled by a cable 6 to a shipborne tactical computer (not shown) on the vessel 2.

The ROV 4 conducts all the MCM tasks swimming 500–1000 m ahead of the parent vessel 2. The vehicle 4 must be capable of a very high degree of maneuverability and control from the parent vessel 2 or from an auto pilot. Conventional ROV propulsion (ducted thrusters) cannot provide the power or the maneuverability to control an ROV large enough to carry the required payload in the water conditions and prevailing currents that are present in coastal locations. The ROV 4 utilises a Tandem Propellor Thruster (TPS) developed by Ametek Straza Division of San Diego California in order to provide the power and maneuverability required.

Figure 2:
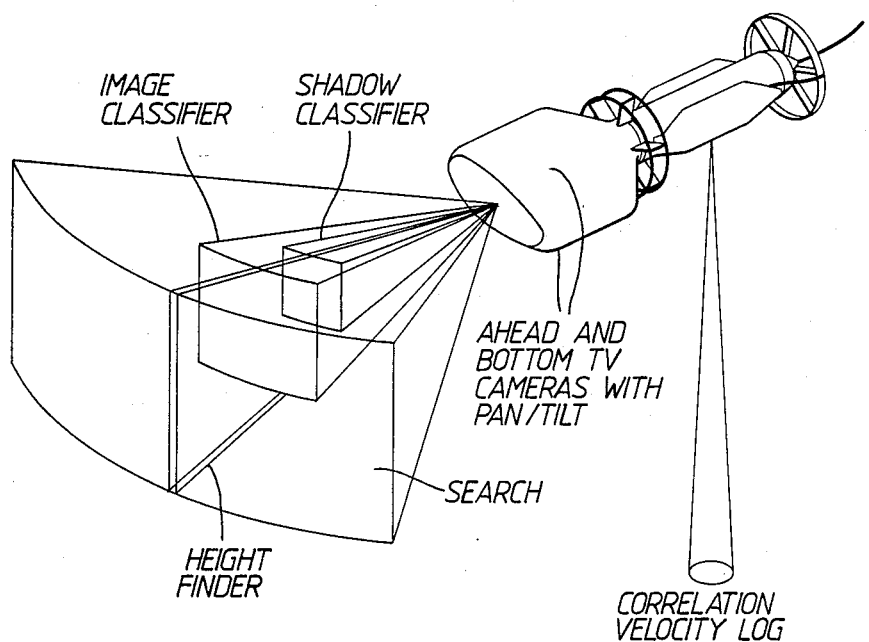

Conventional minehunting sonar is too large and heavy to be installed into an ROV. The remote minehunting system in one embodiment of the present invention shown in FIG. 2, utilises a derivative of the Plessey Naval Systems acoustic mirror sonar as disclosed for example in U.S. Pat. No. 4,571,711, owned in common by the assignee in the present application. The following changes enable the acoustic mirror to perform both Detection, Classification and Identification. The changes include Dual GRP 60° field-of-view reflector, 100 KHz height finding element and dual frequency 300/450 KHz classifier. The inherent control and maneuverability of the ROV 4 enables costly, heavy and large array stabilisation and directing gears to be dispensed with.

The remote minehunting system utilises an autopilot within the ROV which, in conjunction with the embedded control algorithms in the shipborne tactical computer, will provide all the necessary navigation and maneuvering commands to the ROV propulsion system. This includes:

Auto navigation and stabilisation down the selected search track. Including depth/height control.

Auto distance keeping and speed with respect to parent vessel.

Response to hand control from parent vessel when required for classification, identification and disposal.

Auto hover when commanded.

Auto recovery of search track when classification, identification and disposal maneuver is complete.

Continuous indication of ROV position and target position with respect to parent vessel and search area.

The precise navigation and control is achieved by a unique combination of an inertial sensor, an acoustic correlation velocity log and a navigation computer.

The ROV 4 and its sonar are able to operate in the preferred VDS mode with the further advantage that the ROV 4 can be driven ahead of the parent vessel by several hundred yards, The anomaly of sonar classification ranges being within mine damage radii of the ship is obviated by the ROV's stand-off method of operation. Vessel requirements include a hover capability, precise navigation and an integrated AIO system. Considerable savings are achieved with steel construction without costly magnetic and acoustic signature reduction measures. The minehunting system is suitable for inclusion in a container and therefore is ideally suited for minehunting with vessels of opportunity.

Although the present invention has been described with respect to a particular embodiment, it should be understood that modifications may be effected within the scope of the invention.

I claim:

1. A minehunting system for a vessel, comprising a remotely operated vehicle controllably driven forwardly of said vessel, the remotely operated vehicle being equipped with sonar transmission and reception means for detecting, classifying and disposing of a mine, said sonar means including a dual field of view reflector, a height finding element and a dual frequency classifier.

2. A minehunting system as claimed in claim 1, wherein the dual field-of-view reflector has a 60° frequency transducer, said height finding element has a 100 KHZ frequency capability and said dual frequency classifier has a 300/450 frequency characteristic.

3. A minehunting system as claimed claim 1, wherein the remotely operated vehicle is provided with an inertial sensor, an acoustic correction velocity log, and a navigation computer providing navigation and control.

4. A minehunting system as claimed in claim 3, wherein the remotely operated vehicle is provided with an autopilot controlled by a vessel borne computer which provides auto navigation and stabilisation down a selected search track, depth and height control, auto distance keeping and speed with respect to the vessel, response to hand control from the vessel, when required, for classification, identification and disposal of a mine, auto hover, and auto recovery of search track when classification, identification, and disposal of a mine is complete.

* * * * *